US00RE49141E

(19) United States
(12) Reissued Patent
Gayer

(10) Patent Number: US RE49,141 E
(45) **Date of Reissued Patent: *Jul. 19, 2022**

(54) RETAINING RING FOR PRESSURE VESSEL CONNECTION

(71) Applicant: Jason Gayer, Springfield, MO (US)

(72) Inventor: Jason Gayer, Springfield, MO (US)

( * ) Notice: This patent is subject to a terminal disclaimer.

(21) Appl. No.: 16/455,232

(22) Filed: Jun. 27, 2019

Related U.S. Patent Documents

Reissue of:
(64) Patent No.: 9,689,518
Issued: Jun. 27, 2017
Appl. No.: 12/722,620
Filed: Mar. 12, 2010

U.S. Applications:
(60) Provisional application No. 61/159,496, filed on Mar. 12, 2009.

(51) Int. Cl.

| | |
|---|---|
| ***F16L 41/00*** | (2006.01) |
| ***F16B 2/10*** | (2006.01) |
| ***F16L 23/032*** | (2006.01) |
| ***F16L 23/10*** | (2006.01) |
| ***F16L 23/028*** | (2006.01) |

(52) U.S. Cl.
CPC ..... *F16L 41/008* (2013.01); *F16B 2/10* (2013.01); *F16L 23/0283* (2013.01); *F16L 23/032* (2013.01); *F16L 23/10* (2013.01); *Y10T 403/53* (2015.01)

(58) Field of Classification Search
CPC . Y10T 403/53; Y10T 403/3961; F16L 41/008
USPC ..... 285/205, 206, 208, 405, 406, 407, 414, 285/415
See application file for complete search history.

(56) References Cited

U.S. PATENT DOCUMENTS

| | | | | | |
|---|---|---|---|---|---|
| 432,318 | A | | 7/1890 | Mathews et al. | |
| 630,641 | A | | 8/1899 | Albree | F16L 55/178 285/413 |
| 674,928 | A | * | 5/1901 | Mauran | F16L 23/032 285/412 |
| 696,603 | A | | 4/1902 | Smith | |
| 961,987 | A | | 6/1910 | Rust | |
| 1,099,417 | A | | 6/1914 | Armstrong | |
| 1,493,107 | A | * | 5/1924 | Cowen | F16L 55/168 285/414 |
| 1,556,745 | A | * | 10/1925 | Banta | F16L 21/08 285/374 |
| 1,613,926 | A | * | 1/1927 | Bropson | E03D 11/16 285/56 |
| 1,622,768 | A | * | 3/1927 | Cook | F16L 21/04 285/356 |
| 1,784,667 | A | | 12/1930 | Gillet | |
| 1,921,818 | A | | 8/1933 | Haagen | |

(Continued)

*Primary Examiner* — Russell D Stormer
(74) *Attorney, Agent, or Firm* — Law Office of Mark Brown, LLC; Mark E. Brown

(57) ABSTRACT

A split retaining ring for a connection assembly adapted for connecting an instrument or other device to a vessel, such as a pressure vessel. The connection assembly includes a base, an instrument or device, and a split retaining ring wherein the split retaining ring includes overlapping end portions. The split retaining ring also includes an annular rib adapted for engaging a ferrule of the instrument or device in order to substantially sealing engage the instrument or device to the base.

2 Claims, 7 Drawing Sheets

Amended

(56) References Cited

U.S. PATENT DOCUMENTS 2,009,744 A * 7/1935 Pfefferle ..... F16L 55/178 277/623
2,135,733 A 11/1938 Richardson
2,911,239 A 11/1959 Marzolf, Sr.
3,415,547 A 12/1968 Yano
3,551,006 A 12/1970 James
3,558,980 A 1/1971 Florence
3,726,549 A * 4/1973 Bradley, Jr. ..... F16L 21/04 285/356
3,726,768 A 4/1973 Lundquist et al.
4,023,836 A * 5/1977 Applehans ..... F16L 23/02 285/413
4,170,260 A 10/1979 Rudd et al.
4,519,639 A 5/1985 Florian
4,568,112 A * 2/1986 Bradley, Jr. ..... F16L 21/08 285/415
4,889,370 A 12/1989 Firestone
5,314,215 A 5/1994 Weinhold
5,385,552 A 1/1995 Haber et al.
5,413,389 A * 5/1995 Schlicht ..... F16L 23/032 285/414
5,492,372 A 2/1996 Dranberg
5,653,481 A * 8/1997 Alderman ..... F16B 31/04 24/279
6,015,170 A * 1/2000 Carpenter ..... F16L 23/00 285/223
6,026,521 A 2/2000 Atkins
6,155,606 A * 12/2000 Phillips ..... E03D 11/16 285/56
6,264,251 B1 7/2001 Kunsman et al.
6,315,335 B1 * 11/2001 Seedorff ..... 285/415
6,432,563 B1 8/2002 Phillips
6,435,563 B2 8/2002 Phillips
7,114,752 B2 * 10/2006 Voelker ..... F16L 27/12 285/415
8,328,245 B2 * 12/2012 Gayer ..... B01J 3/002 285/415
2008/0001053 A1 * 1/2008 Sandy ..... F16L 23/08 248/544
2011/0260091 A1 * 10/2011 Feldmeier ..... F16K 11/20 251/331

* cited by examiner

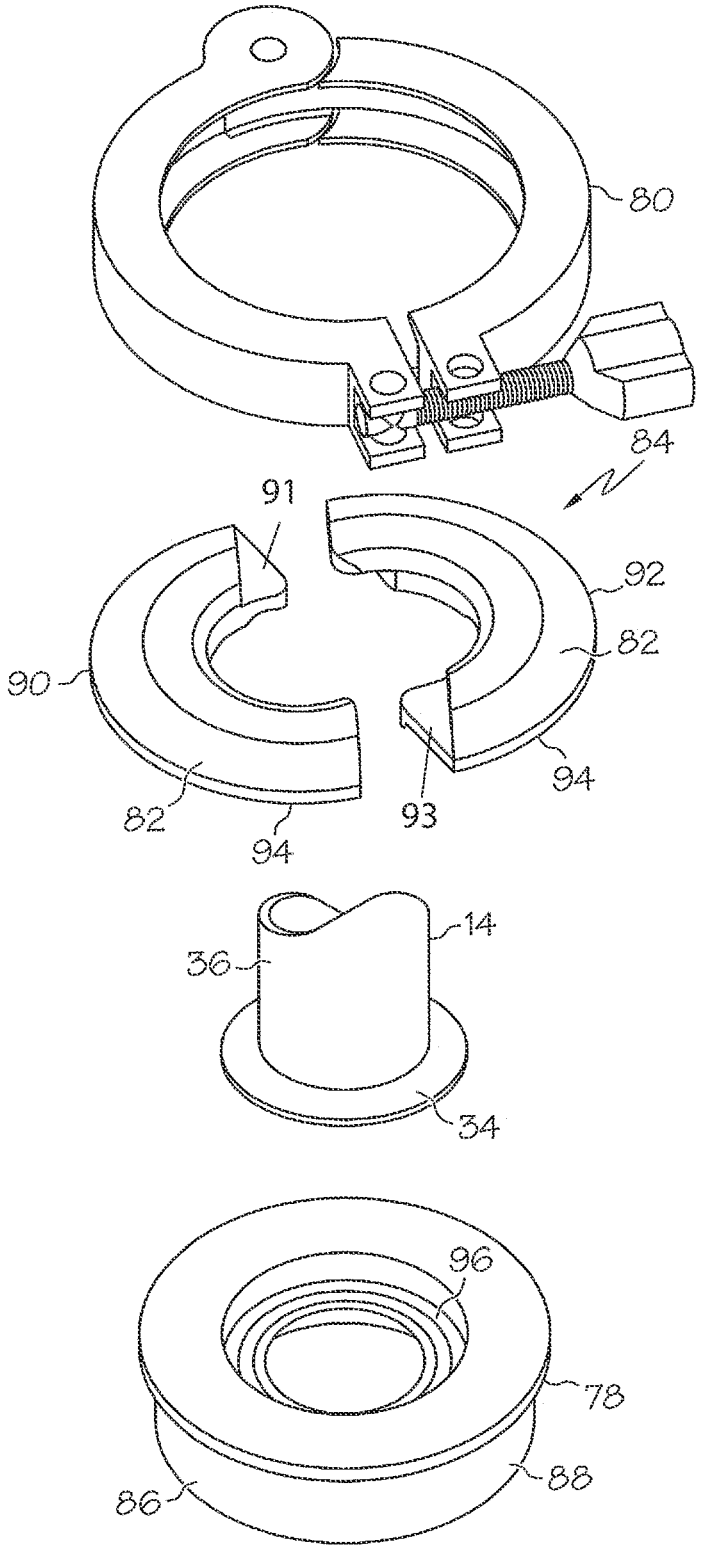
FIG. 5
Amended

RETAINING RING FOR PRESSURE VESSEL CONNECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This nonprovisional application claims the benefit of Provisional Patent Application Ser. No. 61/159,496 filed Mar. 12, 2009, the entire disclosure of which is incorporated herein by reference.

BACKGROUND OF THE INVENTION

Pressure vessels are utilized in many industries for manufacturing products when maintaining specific temperatures and pressures is required. Industries using pressure vessels include but are not limited to pharmaceutical, chemical, food and beverage, medical, biotechnical, ethanol, dairy, water treatment, paper, cryogenic, and other industries requiring chemical or biological processing in a pressurized environment. The processes that require the use of pressure vessels often require instrumentation and other devices to measure and control operating conditions such as temperature, pressure, liquid level, and other parameters through various known instrumentation. Further, these industries may also require pressure vessels to have inlets, outlets, or ports to introduce or remove contents, obtain samples of the contents of the tank while maintaining a sterile or sealed environment, or perform other related actions.

Connections utilizing a retaining ring to hold instrumentation and other devices in sealed connection with a base mounted to a pressure vessel are well known in the art. In many cases, the instrumentation and devices are configured such that a solid (i.e., continuous and non-split) retaining ring is not able to slide over the entire instrumentation or device. In such cases, it has become common to use a split retaining ring constructed of two or more sections.

Split retaining ring connections, such as the NovAseptic® connector and the ASEPCONNECT™ connector, are well known in the art and utilize a base welded to the pressure vessel and a split retaining ring. The instrumentation is secured to the base by the split retaining ring that, when tightened, engages the instrument's ferrule and compresses the ferrule and an elastomeric seal against a seat in the base thereby effectuating the connection. The compression required to create the seal and connection is created using four or more threaded fasteners or bolts that can be tightened to achieve a desired compressive force and resistance.

A large number of pressure vessels manufactured and in use today are outfitted with bases designed for utilizing split retaining ring connections. A shortcoming of the prior art bolted split retaining ring connection relates to the thickness of the split retaining ring itself. The two or more sections of the split retaining ring act independently of one another. Because the split retaining ring sections act independently from one another, the bending forces exerted on the sections' free ends require the ring to be of an increased thickness, as compared to a solid ring, in order to meet certain industry codes, regulations and/or standards. The split retaining ring's increased thickness often presents clearance issues with the instrumentation and devices held in place by the split retaining ring. For example, the instrumentation and devices will sometimes have wires, fittings, couplings and other items extending therefrom that are obstructed by or in interference with the split retaining ring.

Therefore, a need exists for an improved split retaining ring having a reduced thickness to decrease the total depth of the pressure vessel connection so as not to interfere with or obstruct the instrumentation or device the split retaining ring is holding in place. A need also exists for a split retaining ring that has the strength characteristics similar to those of a solid, continuous ring. A need further exists for a split retaining ring that has increased strength characteristics so that it can be manufactured from a smaller amount of material.

BRIEF SUMMARY OF THE INVENTION

The present invention is generally directed towards a connection assembly having a base, an instrument, and a split retaining ring that includes at least two sections having overlapping ends in order to substantially duplicate the strength and load resistance of a continuous retaining ring. The split retaining ring of the present invention can provide the strength required by certain industry codes, regulations and standards while having a decreased thickness and being manufactured from a smaller amount of material. The decrease in the split retaining ring's thickness enables it to be compatible with a wider variety of existing instrumentation and devices currently available in the market place.

One embodiment of the split retaining ring of the present invention includes ends that overlappingly engage one another to form an overlap joint. A threaded fastener may be located through the overlapped joint such that the split retaining ring of the present invention substantially duplicates the action of a solid, continuous retaining ring. In this embodiment, the instrumentation is secured to the base by tightening the threaded fastener in order to operably engage the instrumentation with the base until a desired torque or compression clamping force is reached.

Another embodiment of the present invention is directed to a split retaining ring that may be used in connection with a base having a beveled flange disposed therearound. The split retaining ring in such an embodiment includes at least two sections having ends that are overlappingly engaged and a top surface that is beveled around at least a portion of its perimeter. The instrument or device is retained by the split retaining ring through a tri-clamp or other sanitary clamp known in the art constricting and clamping the ring's beveled top surface with the base's beveled flange.

BRIEF DESCRIPTION OF THE SEVERAL VIEWS OF THE DRAWING

The accompanying drawing forms a part of the specification and is to be read in conjunction therewith, in which like reference numerals are employed to indicate like or similar parts in the various views, and wherein:

FIG. 5 is a top perspective exploded view of a clamped split retaining ring connection assembly in accordance with one embodiment of the present invention.

DETAILED DESCRIPTION OF THE INVENTION

The following detailed description of the invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
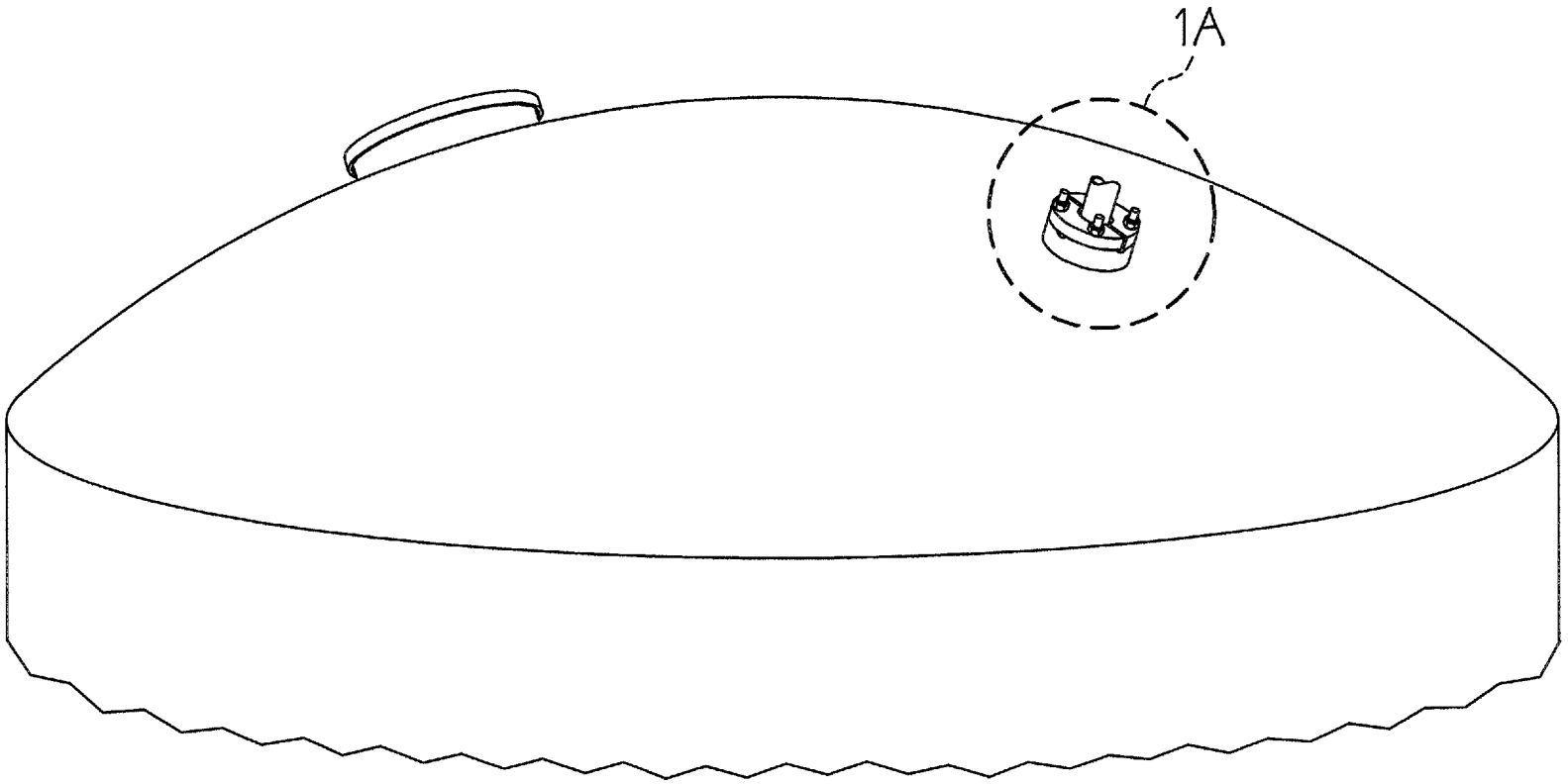
FIG. 1 (PRIOR ART)
FIG. 1 is a top perspective view of a prior art bolted split retaining ring connection assembly on a vessel.
Figure 1A:
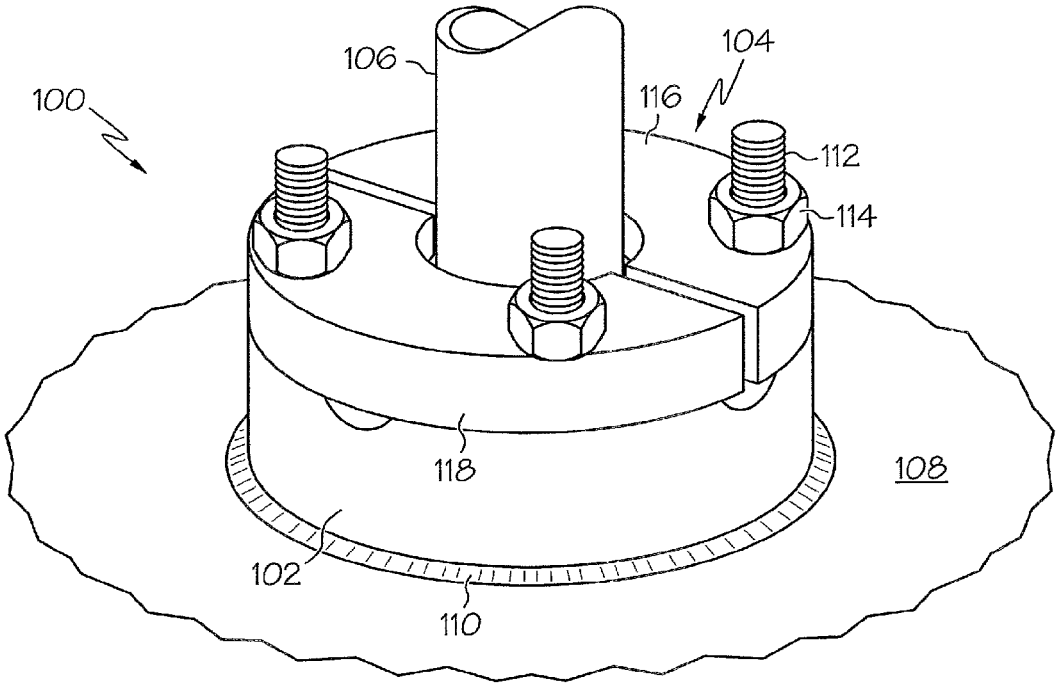
FIG. 1A (PRIOR ART)
FIG. 1A is a top perspective view of the assembled prior art bolted split retaining ring connection assembly having independent split retaining ring sections.

Turning now to the drawing figures, FIG. 1 illustrates an embodiment of a split retaining ring connector known in the prior art to connect instrumentation to vessels, such as pressure vessels. FIG. 1A shows an embodiment of a prior art connector 100 including a base 102 that uses a recessed housing and a split retaining ring 104 to secure instrumentation 106 to the base 102. The base 102 is typically coupled to the wall of the vessel 108 through a weld 110. As illustrated, the retaining ring 104 is split into two independent sections 116 and 118. These independent sections 116 and 118 of the prior art split retaining ring 104 must be thicker than a continuous ring in order resist the bending forces exerted on the sections' 116 and 118 free ends and meet certain industry codes, regulations and/or standards. Each split retaining ring section 116 and 118 has two threaded rods 112 extending through two holes in the sections 116 and 118 and nuts 114 to tighten the sections 116 and 118 such that they engage a portion of a ferrule of an instrument or device 106 to be secured and apply the sufficient compressive clamping force to effectuate a seal and secure the connection.

Figure 2:
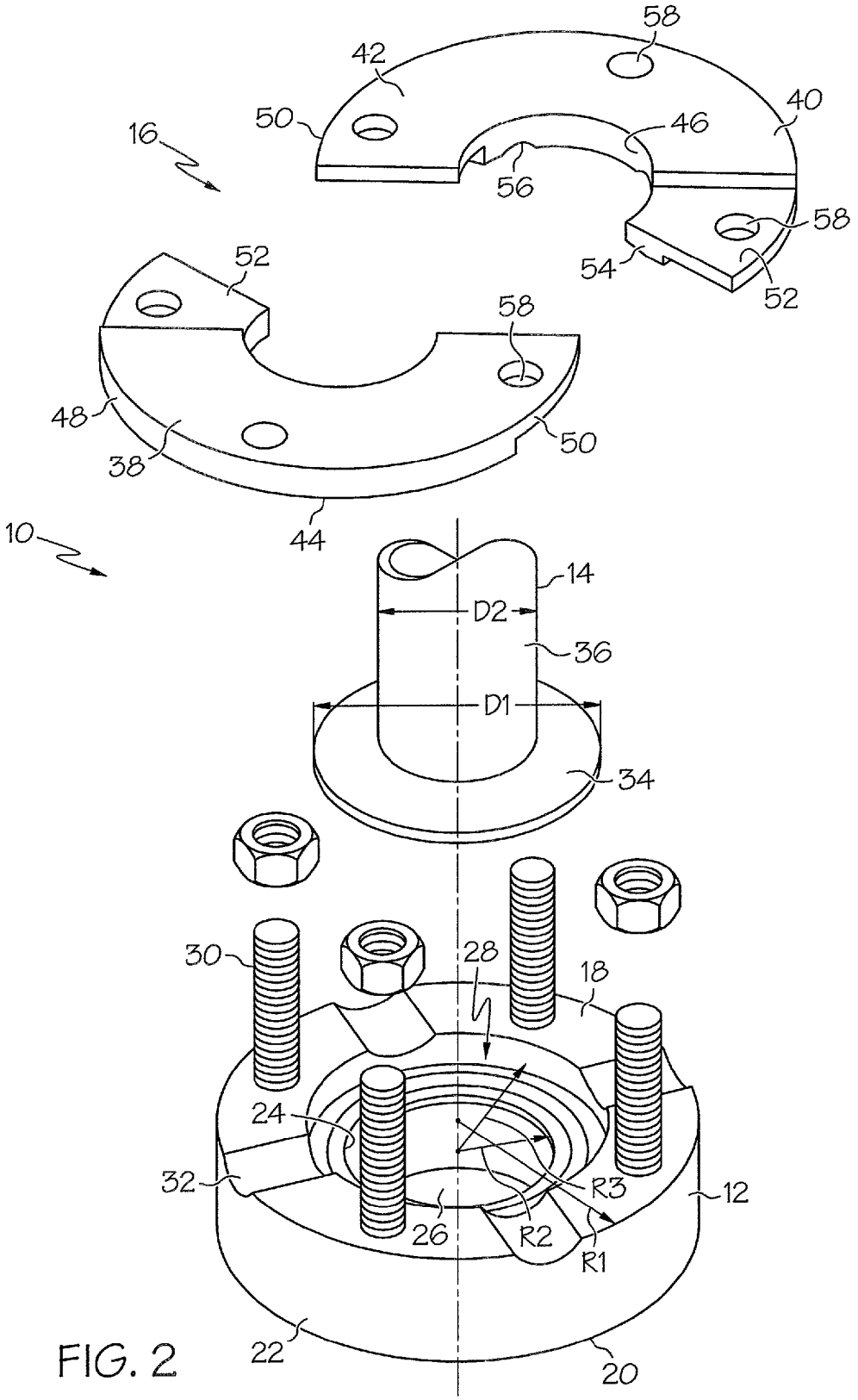
FIG. 2 is an exploded view of the bolted split retaining ring connection assembly in accordance with one embodiment of the present invention.

FIG. 2 illustrates an embodiment of the split retaining ring of the present invention with an exploded view of a pressure vessel connection assembly 10. The pressure vessel connection assembly 10 of the present invention includes a base 12, an instrument 14, and a split retaining ring 16. Base 12 of pressure vessel connection assembly 10 includes a top 18, a bottom 20, an outer face 22, and an inner face 24. As further illustrated in FIG. 2, base 12 has a circular geometry wherein base 12 has radius R1 that generally defines outer face 22. It would be appreciated by a person of skill in the art that base 12 is not limited to a circular shape. Base 12 may be any shape in the art including, but not limited to, a square, rectangle, oval, triangle, pentagon, hexagon, octagon and the like.

As shown in FIG. 2, base 12 has radius R2 that generally defines a base aperture 26. Radius R2 and aperture 26 generally correspond to a defined dimension corresponding to instrument 14 or other standard device dimensions known in the art. Aperture 26 is shown in FIG. 2 having a circular geometry. However, aperture 26 may be configured to any geometrical shape known in the art including, but not limited to, a square, rectangle, oval, triangle, pentagon, hexagon, octagon and the like. Base 12 further includes a recessed instrument housing 28. The area of instrument housing 28 of base 12 is generally defined by a radius R3 from the connection centerline as shown in FIG. 2. Radius R3 is generally greater than radius R2 and less than radius R1. An embodiment of the present invention may also include threaded rods 30 that are received by and/or extend from base 12. In another embodiment, the base 12 may include a threaded aperture for receiving a bolt (not shown) in place of rod 30. As shown, the top 18 of base 12 includes at least one groove 32 allowing the connection assembly 10 to drain if condensation or other moisture is present within the instrument housing 28.

Device or instrument 14 can be any apparatus or instrument now known or hereafter developed for being connected to a pressure vessel including, but not limited to a sensor, temperature or pressure gauge, thermo-well, thermo-coupler, pressure switch, pump, reducer, fitting, valve, pipe, Ingold®-type adapter, sampling system, cleaning device and any other apparatus or instrumentation suitable for connection with a pressure vessel. It should be understood that for demonstration purposes, instrument 14 as shown in the figures merely represents an actual instrument that would be used in industry and that the actual instrument or device may be of a structure and form different from that depicted in the drawings. It should also be understood that while the vessel 108 may be described as being a pressure vessel, the present invention, including the retaining ring 104, is suitable for use with non-pressure bearing vessels as well.

Embodiments of certain instruments 14 generally include a ferrule 34 and a body portion 36 as shown in FIG. 2. Ferrule 34 has a diameter D1 corresponding to a number of various standard sizes known in the art, with most sizes being in a range from about one to twelve (1-12) inches. It will be understood, however, that the present invention may be adapted for use with instruments 14 having ferrules 34 smaller than one (1) inch in diameter and larger than twelve (12) inches in diameter. Generally, instrument housing 28 of base 12 is configured to receive ferrule 34 of instrument 14. Therefore, it will be appreciated by one skilled in the art that the present invention shall not be limited to a circular ferrule 34 and housing 28 as shown in FIG. 2 and that ferrule 34 and housing 28 may each be any shape known in the art including, but not limited to, a square, rectangle, oval, triangle, pentagon, hexagon, octagon and the like. Embodiments of instrument 14 may also include body 36 having a diameter D2.

FIG. 2 also illustrates an embodiment of split retaining ring 16 of the present invention. Split retaining ring 16 includes a first ring section 38 and a second ring section 40. In one embodiment, first ring section 38 and second ring section 40 are identical to one another thereby increasing the manufacturing efficiency. In other words, two identically manufactured sections 38 and 40 may be brought together to form the ring 16. In the embodiment illustrated in FIG. 2, both ring sections 38 and 40 include a top side 42, a bottom side 44, an inner face 46, and an outer face 48. Both ring sections 38 and 40 also include one overlap end 50 and one under-lap end 52. The overlap end 50 of first ring section 38 will overlappingly engage under-lap end 52 of second ring section 40. The overlap end 50 of second ring section 40 overlappingly engages under-lap end 52 of first ring section 38. An embodiment of the present invention may alternatively include a first ring section 38 wherein both ends are configured as overlap ends 50 and second ring section 40 wherein both ends are configured as under-lap ends 52. An embodiment of connection assembly 10 of the present invention may also include a split retaining ring 16 having more than two sections that overlappingly engage one another.

An embodiment of split retaining ring 16 of the present invention includes an annular rib 54 proximate to inside face 46 of sections 38 and 40. An embodiment of annular rib 54 of sections 38 and 40 may include at least one groove 56 as shown in FIG. 2. Groove 56 is generally configured transverse to said annular rib 54 such that groove 56 lines up with groove 32 on top 18 of base 12 when the split retaining ring 16 is in its assembled position.

As shown, the first and second sections 38 and 40 of split retaining ring 16 may have three apertures 58 at a defined spacing as seen in FIG. 2. The sections 38 and 40 may include an aperture 58 at each overlap end 50 and under-lap end 52. When assembled, the ring sections 38 and 40 overlappingly engage to form a continuous ring and the apertures 58 of the overlap ends 50 and the under-lap ends 52 line up to result in a total of four apertures 58 in the assembled ring that match the pattern of the threaded rods 30 extending from base 12. A person of skill in the art will appreciate that any total number of apertures 58 are within the scope of the present invention as the number of apertures 58 will vary upon the number and size of threaded rods 30 or bolts required for the connection to provide the required pressure force resistance.

Figure 3:
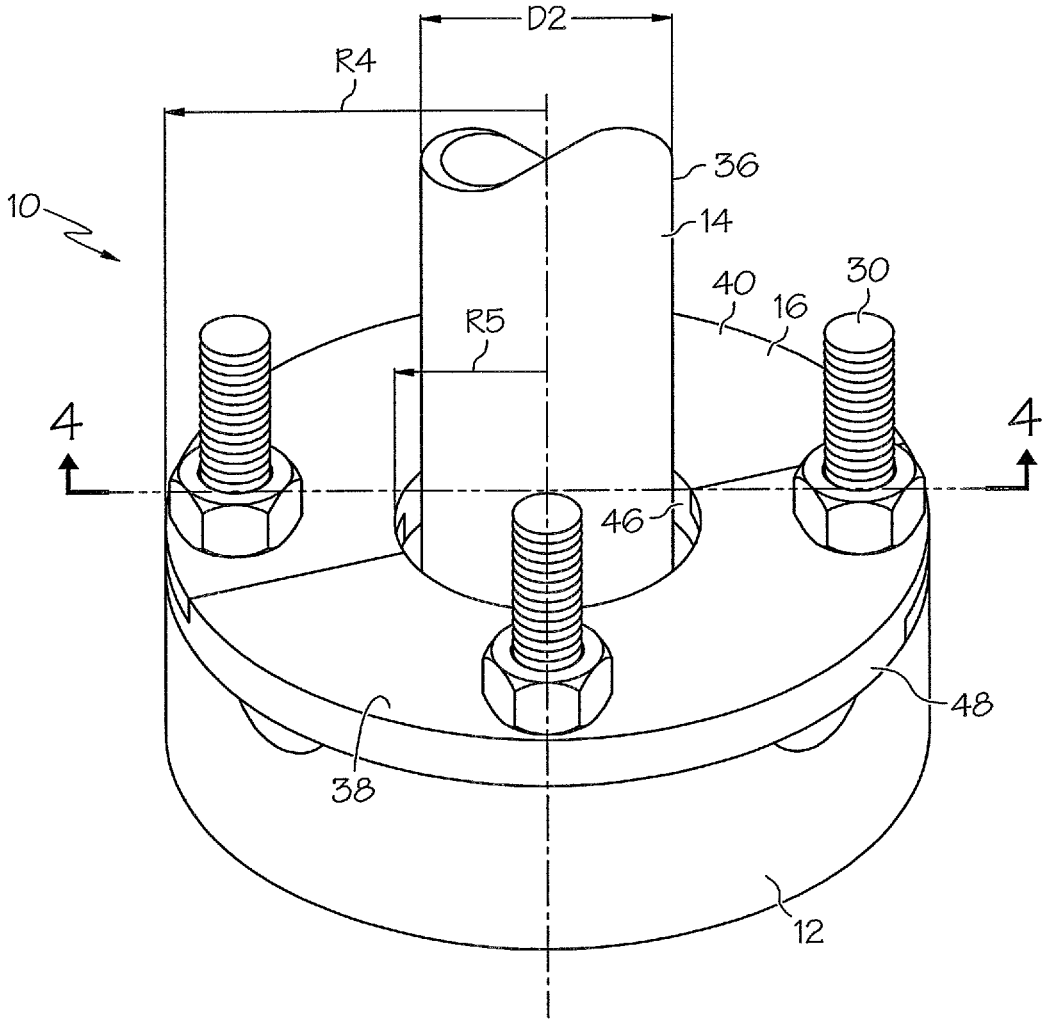
FIG. 3 is a top perspective view of an assembled bolted split retaining ring connection assembly in accordance with one embodiment of the present invention.

FIG. 3 illustrates an embodiment of the present invention wherein split retaining ring 16 has a radius R4 that generally defines outer face 48. While radius R4 is shown as being approximately equal to radius R1 of base 12, it will be appreciated that radius R4 may be greater than or less than the radius R1 of the base 12. As depicted in FIG. 3, the inner face 46 of split retaining ring sections 38 and 40 is defined by a radius R5. Radius R5 is generally configured such that it defines an area larger than the cross-sectional area of body 36 of instrument 14 shown having diameter D2, yet smaller than the area defined by ferrule diameter D1 (shown in FIG. 2) thereby allowing instrument 14 to be retained in the base 12 of connection assembly 10 as seen in FIG. 3. Generally, split retaining ring 16 defines an interior opening of a shape and size that allows split retaining ring 16 to fit around the body 36 of instrument 14, yet is smaller than the diameter D1 of ferrule 34 of instrument 14 allowing instrument 14 to be retained by split retaining ring 16. A person of skill in the art will appreciate that any embodiment of split retaining ring 16 that is consistent with this disclosure is within the scope of the present invention.

Figure 4:
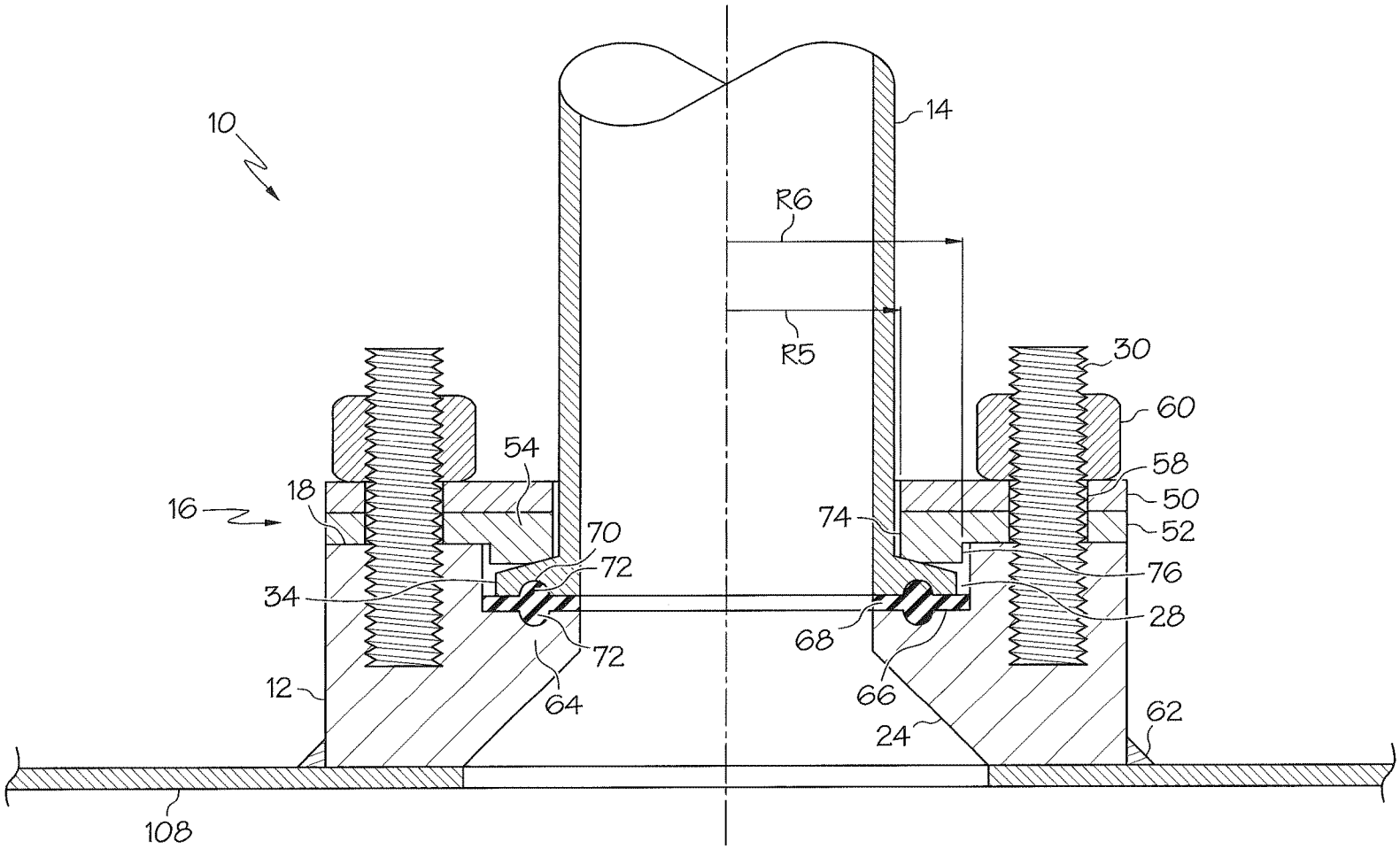
FIG. 4 is a cross sectional view of the assembled bolted split retaining ring connection assembly in FIG. 3 taken along the line 4-4.

Turning now to FIG. 4, a cross sectional view of connection assembly 10 is shown. Base 12 of connection assembly 10 is coupled to the wall of pressure vessel 108 by weld 62. As illustrated, the inside face 24 of base 12 may be tapered. Base 12 generally includes a housing groove 64 in an instrument seat 66 in housing 28. Housing groove 64 generally receives a projection 72 of a seal 68. Seal 68 is typically formed from an elastomeric material; however, seal 68 can be any material known in the art that provides an air-tight and pressure resistant seal. Seal 68 also includes another projection 72 that is received by a ferrule groove 70 on the underside of beveled ferrule 34 of instrument 14 as instrument 14 bears on seal 68 and instrument seat 66 in housing 28. Annular rib 54 of split retaining ring 16 engages on the beveled ferrule 34 of instrument 14. Split retaining ring 16 generally includes annular rib 54 having an inside face 74 defined by radius R5 and an outer face 76 defined by radius R6. Radius R6 of annular rib 54 is generally configured such that annular rib 54 is received in housing 28 as shown in FIG. 4. An embodiment of inner face 74 of annular rib 54 may include a bevel (as shown) to match the beveled ferrule 34 of instrument 14.

In use, split retaining ring sections 38 and 40 overlappingly engage one another to form a substantially continuous ring, and split retaining ring 16 bears on instrument ferrule 34. Nut 60 is operably engaged with threaded rod 30 wherein threaded rod 30 is received by and/or extends from the top 18 of base 12. Nut 60 is tightened down to produce a compressive clamping force upon the split retaining ring 16 against the instrument 14 which in turn engages against seal 68 on instrument seat 66 in housing 28 of base 12. FIG. 4 illustrates threaded rod 30 passing through aperture 58 wherein overlap end 50 overlappingly engages under-lap end 52. When nut 60 is tightened down to secure split retaining ring 16 against beveled ferrule 34 of instrument 14, overlap end 50 and under-lap end 52 are compressed and clamped together. The frictional resistance of the faces of the end section is such that when nuts 60 are tightened to a specified torque, split retaining ring 16 becomes a substantially continuous ring. A person of skill in the art will appreciate that the present invention shall not be limited to a threaded rod and a nut and any fastener that provides adequate compression force and tensile strength, including but not limited to, bolts, screws, pins, cam-action fasteners, or other known fasteners in the art are within the scope of the present invention.

Figure 6:
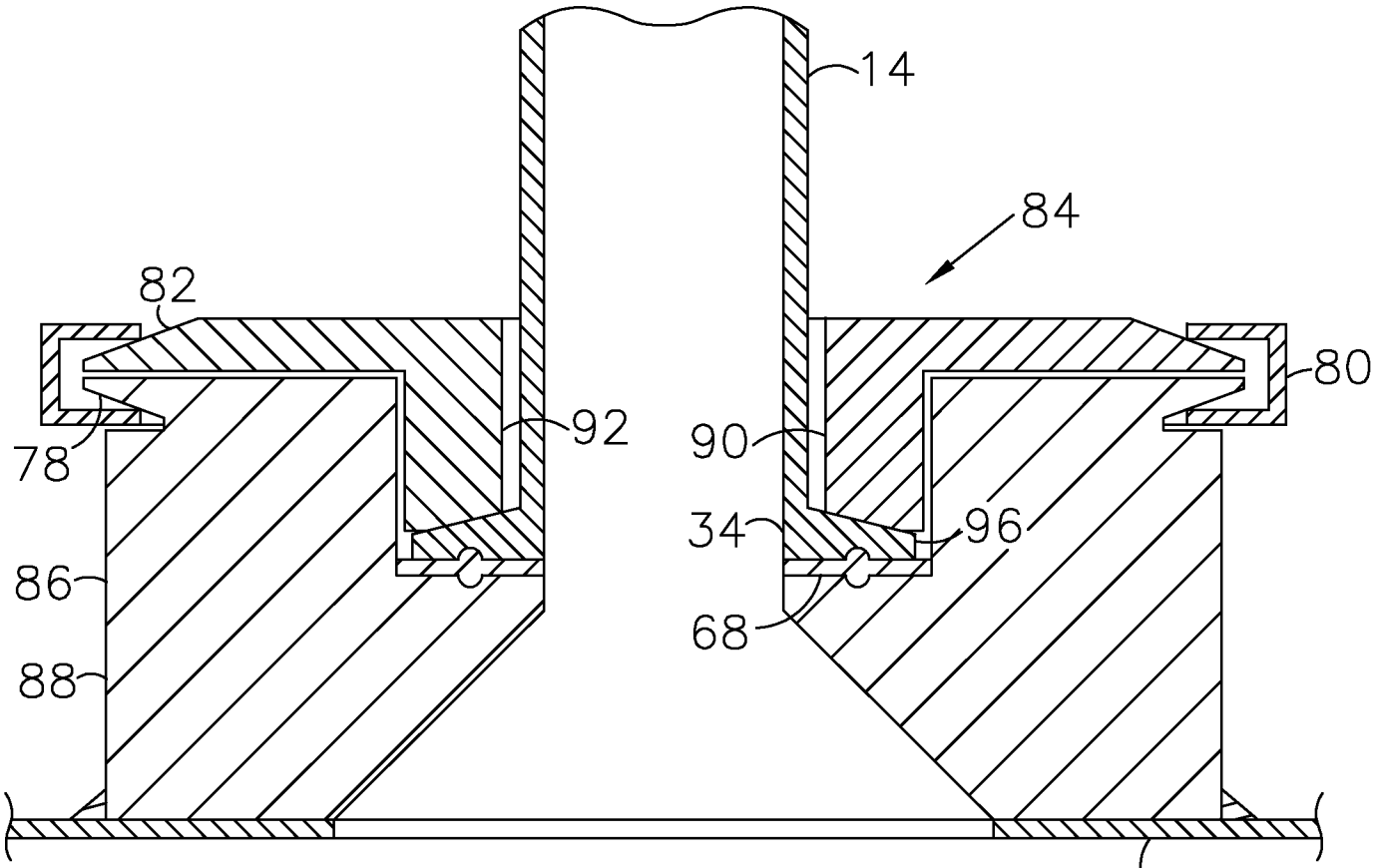
FIG. 6 is a cross sectional view of the assembled clamped split retaining ring connection assembly shown in FIG. 5 in accordance with one embodiment of the present invention.

FIGS. 5 and 6 demonstrate another embodiment of the present invention wherein a traditional tri-clamp 80 secures a split retaining ring 84 to base 86. As shown in FIG. 5, base 86 includes a continuous beveled flange 78 around outside face 88 of base 86. In one embodiment, split retaining ring 84 includes a first and a second split retaining ring section 90 and 92 and the two sections overlappingly engage one another as previously described above. The embodiment illustrated in FIGS. 5 and 6 includes outside face 94 of both ring sections 90 and 92 having a beveled surface 82. Circular clamp 80 fits around beveled flange 78 and bevel 82 of split retaining ring 84 and when clamp 80 is tightened, split retaining ring 84 is wedged downward towards base 86 sealing an instrument or device 14 in housing 96. In general, base 86, split retaining ring 84, and clamp 80 are configured to accommodate the connection of any instrument or device known in the art.

*Each ring section 90, 92 includes one end with a recessed portion 91, 93, respectively which underlies an overlying end of the other ring section whereby there are no continuous gaps through the assembled ring sections 90, 92.*

From the foregoing, it may be seen that the split retaining ring of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

I claim:

[1. A split retaining ring assembly adapted for securing a device to a base, said assembly comprising:

at least two ring sections, each of said at least two ring sections including:

a top side, a bottom side, an outer face, an inner face, a first end and a second end;

an annular rib extending away from and substantially perpendicularly to said bottom side, said annular rib disposed proximate said inner face and having a width extending radially outward from said inner face, said annular rib for extending into a housing to secure a device to a base; and wherein the first end includes a recessed portion of the bottom side and the second end includes a recessed portion of the top side;

a first aperture disposed in the recessed portion of said first end and a second aperture disposed in the recessed portion of said second end, said first and second apertures continuous through said top side and said bottom side.]

[2. The split retaining ring assembly of claim 1 wherein said first aperture and said second aperture of each of said at least two ring sections are adapted for receiving a fastener therethrough for connecting said at least two ring sections to a base.]

[3. The split retaining ring assembly of claim 1 wherein an outer portion of the top side of each ring section is beveled so as to be adapted for being engaged by a clamp.]

[4. The split retaining ring assembly of claim 1 comprising a first ring section and a second ring section, wherein said first end of said first ring section overlaps said second end of said second ring section and said second end of said first ring section underlaps said first end of said second ring section in an assembled condition.]

[5. The split retaining ring assembly of claim 4 wherein said first aperture of said first ring section and second aperture of said second ring section are substantially aligned with one another and said second aperture of said first ring section and said first aperture of said second ring section are substantially aligned with one another when said first ring section and said second ring section are in overlapping engagement in said assembled condition.]

[6. The split retaining ring assembly of claim 5 wherein said aligned apertures defined within said ring sections are sized to receive a threaded fastener.]

[7. The split retaining ring assembly of claim 1 wherein a bottom surface of said annular rib of each of said ring sections is beveled.]

[8. The split retaining ring assembly of claim 7 wherein said beveled bottom surface generally corresponds to a slope of a beveled ferrule of a device.]

[9. The split retaining ring assembly of claim 8 wherein said beveled bottom surface of each said annular rib further includes at least one groove defined therein in an orientation transverse to said annular rib.]

[10. A split retaining ring assembly for retaining a device within a recessed housing of a base of a connection assembly mounted on a vessel, said split retaining ring assembly comprising:

substantially identical first and second ring sections, each of said ring sections including:

a top side, a bottom side, an outer face, an inner face, a first end and a second end;

an annular rib extending away from and substantially perpendicularly to said bottom side proximate said inner face, said annular rib having a width extending radially outward from said inner face, and said annular rib having a beveled bottom surface for engaging a beveled ferrule of a device in order to secure a device within a recessing housing of said base; and wherein the first end includes a recessed portion of the bottom side and the second end includes a recessed portion of the top side;

a plurality of apertures continuous through said top side and said bottom side with a first end aperture disposed in said recessed portion of the bottom side of said first end and a second end aperture disposed in said recessed portion of the top side of said second end and wherein each aperture is sized for receiving a fastener therethrough for connecting each said ring section to said base; and wherein the first end of said first ring section is configured to overlap the second end of said second ring section and said first end of said second ring section is configured to overlap the second end of said first ring section such that said first end aperture of said first ring section is substantially aligned with said second end aperture of said second ring section and said second end aperture of said first ring section is substantially aligned with said first end aperture of said second ring section.]

11. A split retaining ring assembly adapted for securing a device to a *housing including* base, said assembly comprising:

at least two ring sections, each of said at least two ring sections including:

a top side, a bottom side, an outer face, an inner face, a first end and a second end;

an [annular] *arcuate* rib extending away from and substantially perpendicularly to said bottom side, said [annular] *arcuate* rib disposed proximate said inner face and having a width extending radially outward from said inner face, said [annular] *arcuate* rib for extending into [a] *the* housing to secure [a] *the* device to [a] *the* base; and wherein the first end includes a recessed portion of the bottom side and the second end includes a recessed portion of the top side; *and* a first aperture proximate said first end and a second aperture proximate said second end, said first and second apertures continuous through said top side and said bottom side; and said bottom side and said [annular] *arcuate* rib includes at least one groove defined therein in an orientation transverse to said [annular] *arcuate* rib and extending from said inner face to said outer face.

*12. A split retaining ring assembly adapted for securing a device to a base, said assembly comprising:*

*at least two ring sections, each of said at least two ring sections including:*

*a top side, a bottom side, an outer face, an inner face, a first end and a second end;*

*an arcuate rib extending away from and substantially perpendicularly to said bottom side, said arcuate rib disposed proximate said inner face and having a width extending radially outward from said inner face, said arcuate rib for extending into a housing to secure said device to said base;*

*the first end of each said ring section includes a recessed portion of the bottom side and the second end of each said ring section includes a recessed portion of the top side;*

*each ring section first end recessed portion overlying the second end recessed portion of an adjacent ring section;*

*a bottom surface of said arcuate rib of each of said ring sections is beveled;*

*wherein said beveled bottom surface generally corresponds to a slope of a beveled ferrule of said device; and*

*a threaded fastener subassembly configured for connecting portions of said split retaining ring, clamping said adjacent ring section ends together at said overlying recessed portions and clamping said device to said base.*

* * * * *